US006456228B1

(12) United States Patent
Granhed et al.

(10) Patent No.: US 6,456,228 B1

(45) Date of Patent: Sep. 24, 2002

(54) ENCAPSULATED ANTENNA IN PASSIVE TRANSPONDERS

(75) Inventors: Magnus Granhed, Annelundsvägen 15, S-181 46 Lidingö (SE); Peter Fuks, Järfälla (SE); Gunnar Larsson, Täby (SE); Anders Rehn, Lidingö (SE)

(73) Assignee: Magnus Granhed, Lidingö (SE)

(*) Notice: Subject to any disclaimer, the term of this patent is extended or adjusted under 35 U.S.C. 154(b) by 0 days.

(21) Appl. No.: 09/500,305

(22) Filed: Feb. 8, 2000

(30) Foreign Application Priority Data

Feb. 9, 1999 (SE) .............................................. 9900430
Dec. 16, 1999 (SE) .............................................. 9904624

(51) Int. Cl.[7] .............................................. G01S 13/75

(52) U.S. Cl. .............................................. 342/51; 342/42

(58) Field of Search .............................. 342/42–51, 22, 342/175, 192, 193; 340/505, 10.1, 10.2–10.6

(56) References Cited

U.S. PATENT DOCUMENTS 3,731,180 A 5/1973 Napoli et al.
4,068,232 A * 1/1978 Meyers et al. ................ 342/44
4,123,754 A * 10/1978 Armstrong ................... 342/44
4,331,957 A 5/1982 Enander et al.
4,656,478 A 4/1987 Leuenberger ................ 342/51
5,119,099 A * 6/1992 Haruyama et al. ............ 342/51
5,465,099 A 11/1995 Mitsui et al. ............... 343/730

FOREIGN PATENT DOCUMENTS

EP 0344 855 A2 12/1989

OTHER PUBLICATIONS

Kahn, K.–D., European Search Report, App. No. EP 99 00 10 2351, May 10, 2000, pp. 1–2.

* cited by examiner

*Primary Examiner*—Bernarr E. Gregory
(74) *Attorney, Agent, or Firm*—Jenkens & Gilchrist, P.C.

(57) ABSTRACT

A passive transponder comprises an antenna (1, 2) in the form of a metal body with two main surfaces and a diode (3) connected between the main surfaces and a dielectric (10) surrounding the antenna. A characteristic of the invention is that the impedance of the antenna is adapted to the impedance of the diode by matching unit (13, 14). A transmission line (8) is used as the matching unit. Another characteristic for the invention is that the transmission line is surrounded by a dielectric (10) made of plastic. Yet another characteristic of the invention is that the antenna is surrounded by a dielectric made of plastic which reduces the influence of the surroundings on the near field of the antenna.

6 Claims, 3 Drawing Sheets

ENCAPSULATED ANTENNA IN PASSIVE TRANSPONDERS

FIELD OF THE INVENTION

The invention relates in general to a passive transponder used for the localization of people and of objects with the help of a radio transmitter which transmits RF-energy on one frequency and with the help of a radio receiver which receives RF-energy retransmitted on another frequency by the transponder.

STATE OF THE ART

U.S. Pat. No. 4,331,957 describes a passive transponder used for the rescuing of skiers who have been caught in avalanches. The transponder is glued onto a ski boot. The transponder includes an antenna in the shape of a metal foil with two main surfaces and a diode connected between the main surfaces. A mobile radio transmitter with a thereto-connected directional antenna emits radio frequency energy on a base frequency of 915 MHz. A mobile radio receiver, built together with the radio transmitter, is tuned to double the base frequency, 1830 MHz, and is connected to the directional antenna. The signal from the transmitter is modulated with an audio frequency within the audible range. If the transponder is touched by the transmitted signals the diode generates overtones of the base frequency. The first harmonic (double the base frequency) has high energy and is detected by the radio receiver. The rescue people hear this as a tone and can, through taking a bearing with the help of the directional antenna, determine the position of the victim of the avalanche. The big advantage of this searching method is the short time that it takes to investigate the avalanche area.

U.S. Pat. No. 4,656,478 discloses a transponder similar to the one above. The transponder comprises a dielectric support, an antenna and a covering layer. The antenna has a cut out portion, the edge of which defines a conductive line which is closed by a passive component so as to form a self-induction loop. The self-induction loop together with the capacitance of the passive component provide a circuit resonating at the frequency at which the transponder receives its energy. The transformation by the antenna of the energy received by the transponder at the base frequency $f_0$ into energy available for retransmission by the transponder at a harmonic of frequency $f_0$ is achieved with a better yield since the couple self-induction-internal capacitance of the passive component brings about an increase in the voltage at which the transformation is produced. The increase corresponds to the quality factor of the resonating circuit.

U.S. Pat. No. 4,890,111 discloses a transponder similar to the one mentioned in said latter US patent. The antenna elements of the transponder are formed by a metallic ribbon arranged in a planar loop surrounding the cut-out portion. The result of this arrangement is that for equal dimensions the capacitance of the stray capacitor formed by the antenna elements and the body of the person bearing the transponder is much less than in the transponder of the prior art. The arrangement will reduce the influence said stray capacitor will have on the resonating frequency. A T-shaped slot provided in the antenna elements provides a production advantage in that the gain of the transponder is much more constant from one transponder to another than in the case the antenna has no T-formed slot.

U.S. Pat. No. 5,223,851 relates to a miniature transponder including a magnetic antenna with a coil connected to an integrated circuit. In response to a signal received by the antenna the integrated circuit generates an identifying signal which is returned to the antenna for retransmission. A tube of a heat shrinkable material surrounds the transponder and protects it from mechanical shocks. This solution is fundamentally different from the two mentioned above for two reasons: It is based on a single frequency system as opposed to a harmonic (doubled) frequency system, and utilises low frequency as opposed to microwave frequencies.

DISCLOSURE OF THE INVENTION

The human body acts as a water surface that reflects received RF-energy. It is desirable that the RF-waves transmitted by the transponder on the double base frequency and the RF-waves reflected by the human body on the double base frequency are substantially in phase with each other so that the two reflected RF-waves constructively amplify each other. In this way, the RF-power of the received RF-waves on the double base frequency will be maximal. In order to achieve this the transponder should be placed at a certain given distance from the human body. With the given base frequency, this distance is long. So long that in practice it is inappropriate to have an air space between the transponder and the human body. According to the U.S. Pat. No. 3,331,957 the transponder is glued on the outside of a ski boot made of plastic which from a technical point of view means that a dielectric made of plastic is placed between the transponder and the foot, and thereby said given distance is reduced to a practically usable distance.

The applicant has found that a problem occurs if the transponder is mounted in a ski boot made of plastic. The RF-power emitted from the transponder on the double base frequency is reduced. The applicant found that the search equipment must be tuned to a lower frequency compared to when the transponder was glued on the outside of the ski boot in order for the RF-power emitted from the transponder on the double base frequency to be able to be detected with the maximal signal strength. Detection with the maximal signal strength is namely critical in the case that the transponder is at a large distance from the antenna, in which case the signal strength at the receiver is low. It namely must never be so low that the detection of the transponder is completely excluded.

It is desirable that the same search equipment shall be able to be used for the detection of transponders which are glued on boots, respectively for the detection of transponders which are built into boots. Returning of the search equipment is not possible in practice.

A drawback with the transponders of the first two US patents mentioned is that they are sensitive to the environment of the antenna. In particular their respective impedances are influenced by the surroundings of the antenna. A varying antenna impedance results in a degraded RF power retransmitted by the transponder at the first harmonic of the basic frequency.

One object of the invention is to provide a transponder that provides an optimum yield of the RF energy received on the base frequency and the RF energy retransmitted on a first harmonic of the base frequency.

Another object of the present invention is therefore to provide a transponder the impedance of which is generally independent of the surroundings of the antenna.

The invention has the object of avoiding the above-mentioned inconvenience with built-in transponders. This is achieved with the help of the features stated in claim 1.

The advantage that is achieved with the invention is that the near field of the antenna is substantially not, or only to a small degree, influenced by the surroundings of the antenna.

Another advantage which is achieved with the invention is that the dielectric which surrounds the transponder concentrates the RF-energy to a transmission line whereby the influence of the surroundings on the transponder's characteristics are reduced.

In this document the expression dielectric means a material of which the dielectric constant is greater than 1. Through changing the transmission line geometry and the dielectric characteristics of the immediate surroundings of the transmission line an optimal relationship can be obtained between the electrical parameters for the frequencies f and 2f. In this way it is possible to manufacture a transponders which are matched to each given positioning of the transponder, for example in or on a ski boot, a jacket, a lifejacket or the like.

None of the US patents above discloses a matching network for matching the impedance of the passive component to the impedance of the antenna. In particular none of the US patents disclose an impedance matching transmission line.

Furthermore, none of the US patents above discloses a dielectric material surrounding the transmission line so as to concentrate the energy transported by the transmission line to the transmission line itself, thereby making the transmission line generally independent of the surroundings of the transponder.

Finally, none of the US patents discussed above discloses a dielectric material surrounding the antenna so as to reduce the influence the antenna's surroundings on the near-field of the antenna.

ILLUSTRATIVE EMBODIMENTS

Figure 1:
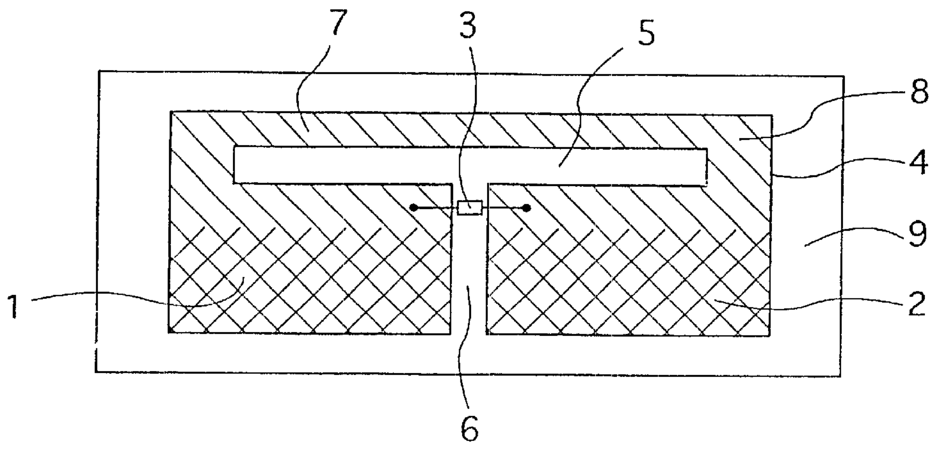
FIG. 1 shows a plane view of a transponder in accordance with a first embodiment of the invention.

FIG. 1 shows a transponder with antenna elements 1, 2 and a diode 3. The antenna elements 1, 2 form an antenna, which in this embodiment is manufactured from a metal foil 4. The metal foil has a T-shaped slot with a horizontal section 5 and a vertical section 6. The diode is situated over the vertical section 6 of the slot. The T-shaped slot divides the metal foil into two main surfaces joined to each other by a supplementary surface 7. The antenna element 1 is a part of one of the main surfaces, the antenna element 2 is a part of the other main surface. The other parts of the respective main parts together form with the supplementary surface a transmission line 8 which in this embodiment of the transponder is short-circuited.

The transmission line is shown with single crosshatching, the antenna elements with double crosshatching. The transition region between the antenna elements and the transmission line is not as sharp as shown in the figures. The diode 3 is soldered between the antenna elements. The antenna elements are etched, stamped or in some other suitable way manufactured from the metal foil 4. The metal foil 4 can be, but does not necessary have to be, placed on a foundation 9.

Figure 2:
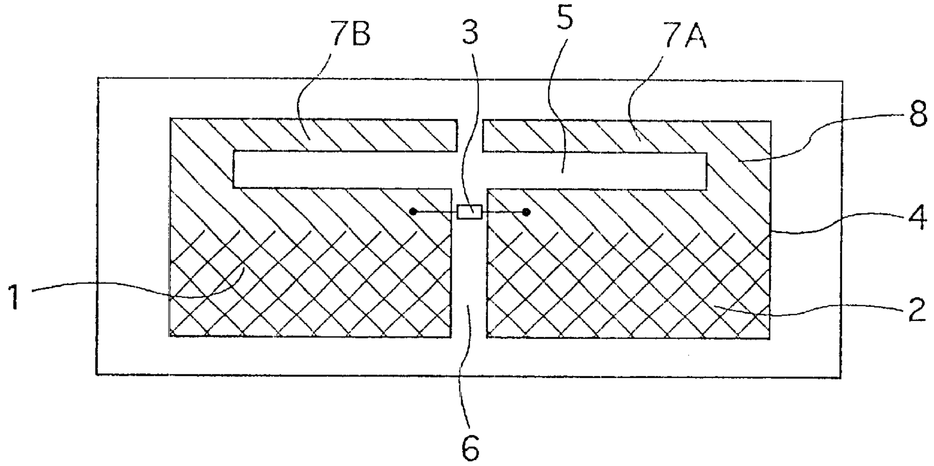
FIG. 2 shows a plane view of a transponder according to a second embodiment of the invention.

FIG. 2 shows a second embodiment of a transponder in accordance with the invention. The embodiment is similar to that shown in FIG. 1 with the difference that the supplementary surface 7 is divided into two supplementary surfaces 7A and 7B, which form a part of the transmission line 9, which is open for direct current but is short-circuited for signals.

Figure 3:
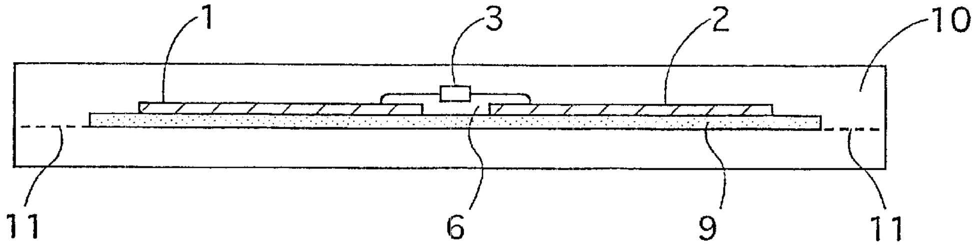
FIG. 3 shows a lateral view of a first way of mounting transponders in accordance with FIGS. 1 and 2.
Figure 4:
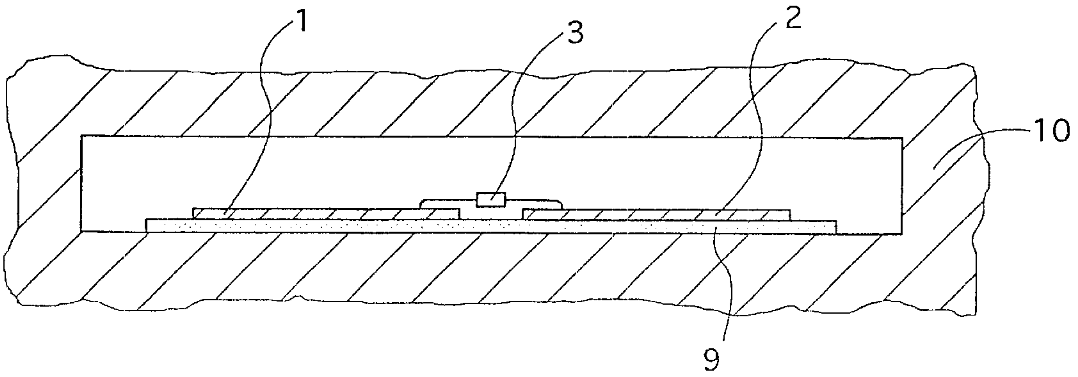
FIG. 4 shows a lateral view of a second way of mounting transponders in accordance with FIGS. 1 and 2.

In accordance with the invention the transponders in FIGS. 1 respectively 2 are enclosed by a dielectric 10. In order to achieve this, the transponders are mounted in a first, respectively second way such as are shown in FIGS. 3 respectively 4. In FIG. 3 the transponder is shown cast in a dielectric, which can be, but does not have to be, made of two layers, as is indicated by the dashed line 11. In FIG. 4 the transponder is mounted inside a cavity in a dielectric 10. The mounting takes place for example by means of adhesive, an adhesive layer on the foundation 9 or in some other suitable way.

The reason for enclosing the whole transponder with the dielectric layer is described in more detail below.

Figure 5:
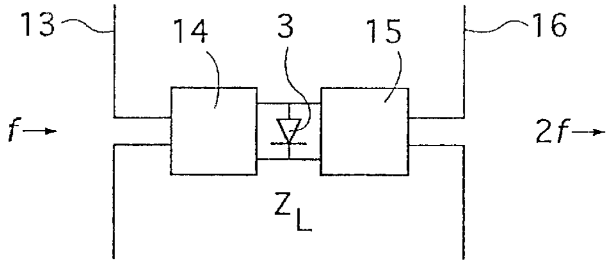
FIG. 5 is an electrical equivalence diagram of a transponder in accordance with the invention.

FIG. 5 shows an electrical equivalence diagram for the transponder 1 in accordance with the invention. This comprises a receiver antenna 13, a first matching network 14 connected between the receiver antenna and the diode 3, a second matching network 15 connected between the diode 3 and a transmitter antenna 16. The receiver antenna receives RF-power on the base frequency f, which is fed to the diode 3 via the first matching network 14. The diode is a non-linear element which generates from the received RF-power a large number of harmonics of the base frequency, amongst which the harmonic of the double base frequency 2f, which is of interest in this connection, via the second matching net is outputted to the transmitter antenna 16. As much as possible of the RF-power received by the receiver antenna 13 on the base frequency shall be supplied to the diode 3 and for this purpose there is the first matching network 14, which matches the impedance of the receiver antenna 13 to the impedance of the diode.

In order to explain the technical background to the invention, FIG. 5 shows that the transponder 1 has two separate antennae 13 and 16 and two separate matching networks 14, 15. In practice these two antennae form a single antenna. Similarly, in practice the two matching networks are a single matching network.

As much as possible of the RF-power generated by the diode on the double base frequency 2f shall be supplied to, and transmitted by, the transmitter antenna 16 and for this purpose the transmitter antenna's impedance is matched to the diode's impedance with the help of the second matching network 15. If these two RF-power parts, that is to say the part of the RF-power received on f and that transmitted on 2f, at the same time are as large as possible then the transponder is said to be optimised and that is what this invention is intended to achieve. If, for example, the transmitter in accordance with the invention is hit by 10 $mW/m^2$ then the receiver antenna 13 absorbs part of this power, for example 0.01 mW. It is this 0.01 mW which then forms the sum of all the harmonic powers inclusive losses. It is this part of these 0.01 mW which is on the frequency 2f which is to be made as large as possible.

In accordance with a preferred embodiment of the invention a transmission line is used as impedance matching network. Through using a transmission line several degrees of freedom in the design of the transponder are obtained and the surroundings otherwise negative influence on the electrical characteristics of the transponder can be used constructively. Seen generally, a transmission line's characteristics are determined by the transmission line's geometry, such as the shape, length, width and thickness of the transmission line, and the electrical parameters of the surroundings. Just the surroundings, electrical parameters can negatively influence the transmission line/antenna's characteristics.

The transmission line is surrounded in accordance with the invention by dielectric, which concentrates electrical field lines to the transmission line. The more closely together the electrical field lines lie with respect to each other within a region, the more RF-energy is transported by the transmission line in this region. Essentially all the transportation of RF-energy takes place inside the dielectric in this design of the matching network. When the transmission line is completely surrounded by a dielectric 10, the surroundings outside the dielectric will hardly at all, or only to a small degree, influence RF-energy transportation.

The skilled person realises that other factors than the surroundings influence the transmission line's impedance, such as the distance between the transmission line's conductors and the dielectric constant of the material that surrounds the transmission line. Similarly the distance between the dielectric and a transmission line influences a transmission line's impedance. Through selecting suitably thicknesses, widths, lengths and the dielectric constant of the dielectric 10 and through surrounding the transmission line with dielectric 10 the said RF-power parts are optimised and the surroundings, influence on the transmission line's impedance is reduced. If the diode is changed then the transmission line's characteristics must be changed so that its impedance corresponds with the diodes impedance and the antenna's impedance.

Figure 6:
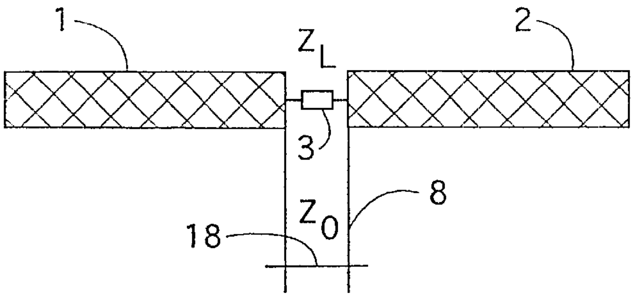
FIG. 6 shows a simplified connection diagram for the transponder according to FIG. 1.

FIG. 6 shows an equivalent electrical connection diagram for a preferred embodiment of a transponder in accordance with the invention. A dipole antenna with antenna elements 1, 2 is fed by transmission line 8, which in a conventional way is shown to be formed of two conductors. A diode 3 connects the antenna elements with each other. A short-circuiting piece 18 connects the transmission line's conductors with each other. The transmission line 8 has a characteristic impedance $Z_0$ and the diode an impedance $Z_L$. This connection diagram corresponds to the embodiment according to FIG. 1. The transmission line can be compared to a gamma-matching system. Through changing the position of the short-circuiting piece along the two conductors the impedance matching can be varied. The double cross-hatched surfaces of the antenna elements 1, 2 in FIG. 6 correspond to the double cross-hatched antenna elements in FIG. 1, while the transmission line 8 in FIG. 6 is corresponded to by the other single cross-hatched foil surfaces in FIG. 1. Through, for example, varying the width and the length of the horizontal slot 5 (FIG. 1) and through surrounding the transmission line with a dielectric, the electrical length of the transmission line and thereby even the impedance matching of the diode antenna system is influenced.

Figure 7:
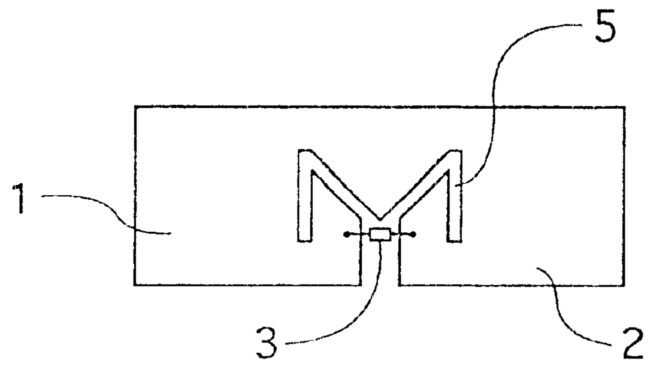
FIG. 7 shows a transponder with an M-shaped slot.

In FIGS. 1 and 2 the slots 5 are shown as having the shape of a T. The T-shape is suitable from a manufacturing technology point of view. A T is also symmetrical which means that the RF-energy distribution on a T-shaped antenna is symmetrical. The shape of the slots is not important for the invention. In alternative embodiments of the transponder the slots are C, O, M, V, W, L-shaped or have some other shape. The applicant has found that the length of the slot influences the transmission line's impedance more greatly than the width of the slot. FIG. 7 shows a transponder with M-shaped slots. Consider FIG. 6. If the short-circuiting piece 18 is changed so that it has a direct current interruption then the antenna elements 1 and 2 will be supplied by a transmission line 8 which with respect to direct current is open but with respect to signals is short-circuited. Such an embodiment corresponds to the transponder in accordance with FIG. 2, which for the rest operates in the same way as the transponder in FIG. 1. The antenna elements 1, 2 in FIG. 6 are shown by the double crosshatched foil surfaces in FIG. 2. The other single crosshatched foil surfaces in FIG. 2 correspond to an open transmission line.

The invention makes it possible to separate the transponder's function as an antenna from the transponder's function as a matching unit. The transponder's function as an antenna and its function as a matching unit are influenced in this way in different ways by the surroundings. As described above, the impedance matching function of a transmission line surrounded by a dielectric is not influenced by the surroundings. In said U.S. Pat. No. 4,331,957, the antenna's impedance is however influenced by the surroundings. The frequency changes referred to in the above description of the problem which occur when the transponder is mounted in a ski boot made of plastic have been found by the applicant to depend on just the surroundings influence on the transponder's impedance characteristics. This does not depend on the reflected and direct RF-waves on the double harmonic of the base frequency being out of phase with each other, which is what the applicant first assumed. The applicant has after innumerable experiments and the design of different theoretical models developed the present invention, which explains the reason for said mentioned frequency shift.

In the embodiment in accordance with FIGS. 1 and 2 the antenna elements and the transmission line are joined together in an advantageous way at the same time as the antenna and matching functions are held separate.

This makes it possible to make the antenna physically small, for example less than half the wave length for the base frequency f, wherein the real part of the antenna's impedance is reduced and its reactive component is increased.

Through arranging a transmission line as the impedance matching means the antenna's impedance can be matched to the diodes impedance and the antenna's reactive component can be eliminated.

With the invention it is possible to dimension the transponder for different exterior surroundings and for different sizes at the same time as the influence of the surroundings on the transponder is reduced. Through the said separation of the antenna function from the matching function the said RF-power optimisation can be achieved through adjusting the transmission line and not the antenna.

At the same time that a dielectric is arranged around the transmission line, RF-power matching is influenced. In a situation where the transponder is carried near to the human body, the human body acts a transponder for incoming RF-power. In particular the RF-power generated and transmitted by the transponder on the double harmonic 2f is reflected. This reflected RF-power on the double harmonic can, through the choice of a suitable thickness of the dielectric 10, be made to lie essentially in phase with the RF-power directly radiated from the transponder on the double harmonic 2f. This increases the field strength of the transponder and is known from said American patent 4,331,957. Such field strength increases, combined with the way of in accordance with the present invention, (i) influencing the power matching with a transmission line and (ii) reducing the surroundings influence on energy transportation in a transmission line, give a transponder with superior electrical characteristics.

It should be mentioned that the transmission line 8 can, but does not need to, act as a DC-return line for RF-current rectified by the diode.

In the embodiments above the matching network by means of which the impedance of the diode is matched to the impedance of the antenna is a transmission line physically integrated with the antenna. It is also within the realm of the present invention to use separate transmission lines, i.e. transmission lines that are not integrated with the antenna but which are electrically connected to the antenna. It is thus possible to use for example a piece of coaxial cable extending between the antenna elements. At one end of the coaxial cable its inner conductor is connected to one of the antenna elements and its braid is connected to the other of the antenna elements, while at the opposite end of the piece of coaxial cable the inner conductor and the braid are terminated in a suitable way. Instead of a piece of coaxial cable other electrically equivalent lumped components may be used as a matching network, for example combinations of discrete components.

Figure 8:
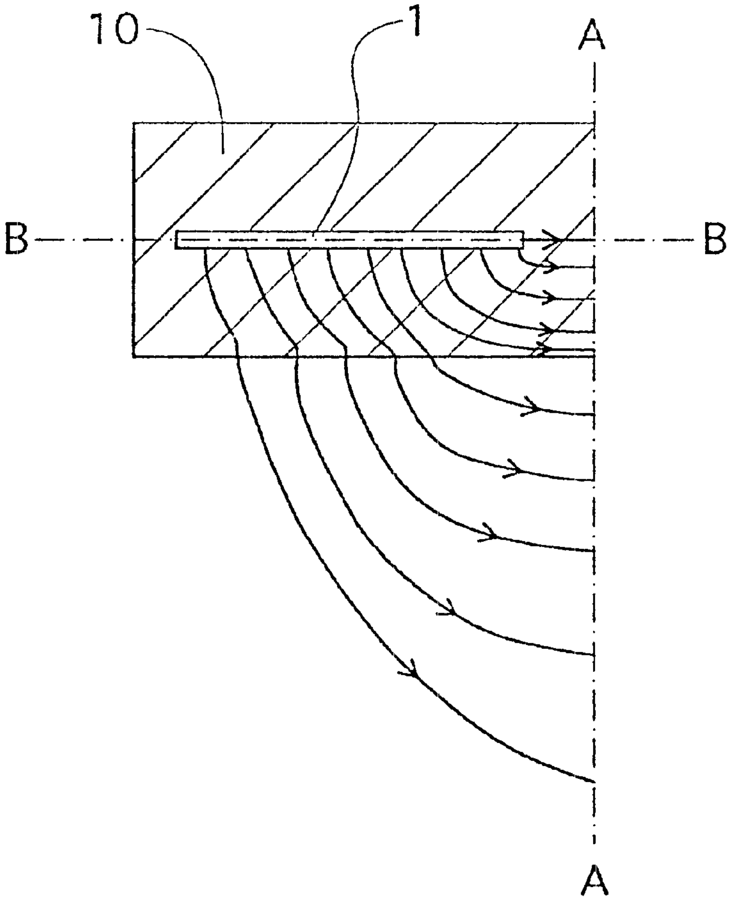
FIG. 8 is a partial lateral view having the lines of symmetry A—A and B—B which lateral view schematically shows the near-field of the RF-energy field around the antenna.

In the above description the electrical field around the transmission line has been considered. In the case that the dielectric only surrounds the transmission line but not the antenna, then a coupling between the antenna's near field and the surrounding of the antenna will occur. In general for antennae it is so that an antenna's near field is related to the wave-length. With the frequencies 917 MHz and 1834 MHz the near field has a size of the order of approximately 6 respectively 3 cm. Said coupling works such that the impedance of the antenna vanes. For example it can be mentioned that if the antenna is near an electrically conducting object an impedance change occurs which depends on the distance to the electrically conducting object. Such an impedance change is not desirable because it counteracts the antenna's matching to the diode and the matching network. The varying antenna impedance causes a problem which is similar to that in the problem description above, namely that the detection equipment must be tuned to another frequency in order to be able to detect the signal retransmitted by the transponder. As has been pointed out previously it is not possible in practise to perform such a retuning. The invention overcomes this problem through surrounding the antenna with a dielectric so designed that the surroundings influence on the antenna's near field is reduced. The RF-energy energy losses in the antenna's near field can thereby be held low meaning that the degree of efficiency of the antenna is good. FIG. 8 shows that when the antenna is surrounded by a dielectric the field lines are concentrated inside the dielectric, which means that a large part of the stored RF-energy exists inside the dielectric. Outside the dielectric the field lines are further apart, which means that the energy exchange between electrically conducting objects in the antenna's near field is very small. The surroundings consequently do not influence the antenna's near field to any great degree. The energy transport in the antenna's distant field is not influenced by the dielectric. It should be pointed out that the field lines are symmetrical around the axes of symmetry B—B in FIG. 8 despite them not being drawn at the top of the figure.

If this dielectric is furthermore designed so that the reactive part of the antenna's impedance and the reactive part of the diode and the matching network's impedance cancel out each other, then the energy which is emitted on twice the transmitter frequency 2f will be maximal. The transponder will therefore resonate. Through the surroundings influence on the near field being reduced, the impedance of the antenna will be essentially constant. The efficiency of the transponder will therefore be good. The resonance frequency for the transponder is not tuned just to the diode but to the diode and to the dielectric. When a dielectric is applied around the antenna the resonance frequency of the transponder decreases, which in the present case is not desirable, because the already existing detector equipment thereby must be tuned to the new resonance frequency, which is not desirable because of the reasons given in the introduction of the description. Therefore the resonance frequency is tuned to the diode and the dielectric. In this case the RF-energy retransmitted by the transponder on twice the base frequency 2f will be maximal.

The matching of the reactive parts of the impedance of the diode and of the matching network to the reactive part of the antenna occurs through varying the dimensions of the antenna or through varying the thickness of the dielectric or through a combination of these actions. For a given thickness of the dielectric the antenna must therefore be changed. Inversely, for a given dimension of the antenna the thickness of the dielectric must be changed. If the dielectric's thickness increases over a certain limit, further increase of the thickness does not lead to the near field being even more independent of the physical surroundings of the antenna. That which has been mentioned in this section about matching is true for a dielectric with a fixed dielectric constant. Matching can also take place through choosing a dielectric material having another dielectric constant.

The matching of the antenna's resonance frequency to the diode and the matching network's impedances takes place through varying the dimensions for the antennae, through varying the matching network's impedance or through a combination of these actions. For a given antenna size the matching network's impedance is varied. For a given matching network the dimensions of the antenna are varied. It is also possible to adapt the reactive part of the antenna's impedance to the reactive part of the diode is and the matching network's impedances through exchanging the diode for a new diode with another electrical characteristics.

An antenna with a dielectric surrounding the antenna can be surrounded by a dielectric material shaped in the way that is shown in the FIGS. 1 and 2. Such an antenna can also be mounted in a casing made of a dielectric material in the way that is shown in FIG. 4.

What is claimed is:

1. A passive transponder comprising:

an antenna having a metal body with main surfaces;

a diode connected between the main surfaces of the metal body;

wherein the passive transponder, when hit by radio-frequency (RF) power of a first frequency f, retransmits RF power of a second frequency 2f;

a first dielectric enclosing the antenna, the first dielectric being adapted to reduce an influence of surroundings of the passive transponder on a near field of the antenna;

a transmission line connected to the antenna and to the diode, the transmission line being adapted to match an impedance of the diode to an impedance of the antenna;

a second dielectric enclosing the transmission line, the second dielectric being adapted to make the transmission line essentially independent of the surroundings of the passive transponder, wherein the passive transponder has a resonance frequency that is matched to an impedance of the diode, an impedance of the first dielectric, and an impedance of the second dielectric.

2. The passive transponder of claim 1, wherein:

the metal body comprises two main surfaces of a metal foil that together form an antenna; and the transmission line comprises:

a slot of predefined length and width provided in the main surfaces;

main surface portions surrounding the slot; and a supplementary surface provided in the metal foil and arranged between the main surfaces.

3. The passive transponder of claim 2, wherein matching of the impedance of the diode to the impedance of the transmission line is achieved by selecting the length and the width of the slot.

4. The passive transponder of claim 1, wherein a reactive portion of the impedance of the antenna is generally matched to the impedance of the diode and to the impedance of the transmission line so as to optimize electrical characteristics of the passive transponder.

5. The passive transponder of claim 1, wherein the first dielectric and the second dielectric are shaped such that a reactive part of the impedance of the antenna cancels a reactive part of the impedance of the diode and a reactive part of the impedance of the transmission line, whereby the passive transponder is resonant.

6. The passive transponder of claim 1, wherein:

the passive transponder is mounted within a cavity of a third dielectric that surrounds the transmission line and the antenna; and the third dielectric comprises the first dielectric and the second dielectric.

* * * * *

UNITED STATES PATENT AND TRADEMARK OFFICE

CERTIFICATE OF CORRECTION

PATENT NO. : 6,456,228 B1 
DATED : September 24, 2002
INVENTOR(S) : Magnus Granhed et al.

It is certified that error appears in the above-identified patent and that said Letters Patent is hereby corrected as shown below:

Title page,
Item [30], Foreign Application Priority Data,
Replace "9900430" with -- 9904430 --

Column 2,
Line 44, replace "Returning of the search" with -- Retuning of the search --

Column 7,
Lines 54-55, replace "The RF-energy energy losses" with -- The RF-energy losses --

Signed and Sealed this

Twenty-ninth Day of April, 2003

JAMES E. ROGAN
*Director of the United States Patent and Trademark Office*